(12) United States Patent
Mital et al.

(10) Patent No.: US 12,019,731 B1
(45) Date of Patent: Jun. 25, 2024

(54) CREDENTIAL MANAGEMENT SERVICE

(71) Applicant: Cyral Inc., Milpitas, CA (US)

(72) Inventors: Manav Ratan Mital, Mountain View, CA (US); Srinivas Nageswarrao Vadlamani, San Jose, CA (US)

(73) Assignee: Cyral Inc., Milpitas, CA (US)

( * ) Notice: Subject to any disclaimer, the term of this patent is extended or adjusted under 35 U.S.C. 154(b) by 416 days.

(21) Appl. No.: 17/356,361

(22) Filed: Jun. 23, 2021

Related U.S. Application Data

(60) Provisional application No. 63/045,652, filed on Jun. 29, 2020.

(51) Int. Cl.
*H04L 9/40* (2022.01)
*G06F 21/45* (2013.01)

(52) U.S. Cl.
CPC ............ *G06F 21/45* (2013.01); *H04L 63/102* (2013.01); *G06F 2221/2103* (2013.01)

(58) Field of Classification Search
CPC ................................ G06F 21/45; H04L 63/102

USPC ............................................................. 726/6
See application file for complete search history.

(56) References Cited

U.S. PATENT DOCUMENTS

| | | | | |
|---|---|---|---|---|
| 10,810,055 | B1* | 10/2020 | Walker | G06F 16/2358 |
| 2018/0373887 | A1* | 12/2018 | Smith | G06F 21/6227 |
| 2019/0342397 | A1* | 11/2019 | Laibson | H04L 9/3213 |

\* cited by examiner

*Primary Examiner* — Kambiz Zand
*Assistant Examiner* — Phuc Pham
(74) *Attorney, Agent, or Firm* — Van Pelt, Yi & James LLP

(57) ABSTRACT

A method for accessing a data repository by a service is described. The method includes requesting an authenticator for credentials using a role-based identity. The services receives, from the authenticator, temporary data repository access credentials that are based on the role-based identity. The temporary data repository access credentials are abstracted from the credentials. The service accesses the data repository using the temporary data repository access credentials.

16 Claims, 4 Drawing Sheets

CREDENTIAL MANAGEMENT SERVICE

CROSS REFERENCE TO OTHER APPLICATIONS

This application claims priority to U.S. Provisional Patent Application No. 63/045,652 entitled CREDENTIAL MANAGEMENT SERVICE filed Jun. 29, 2020, which is incorporated herein by reference for all purposes.

BACKGROUND OF THE INVENTION

There is an increasing number of computing applications and computing services that interact directly with data, without including a human in the loop. Providing security and observability for such applications may be challenging. For example, computing services utilize sensitive data stored in a data repository. In order to connect to the data repository and access the data, the service authenticated. Consequently, the service obtains from a data vault credentials for the data repository. The service stores the credentials and provides these credentials to the data repository in order to be authenticated. After authentication, the service is allowed to engage in transactions with the data repository.

Although this authentication method functions, there are significant drawbacks. Credentials are typically shared credentials, provided out based on the role of the service instead of the identity of the service itself. As the number of services increase, multiple services are more likely to have the same role. Determining which service obtained the credentials and what transactions were carried out by the service is challenging. The credentials provided from the data vault are stored in memory of the service. If the security of the service is compromised, an intruder can gain access to the credentials and thus the sensitive data in the data repository. The service could also inadvertently expose the credentials. Thus, services present vulnerabilities for sensitive data repositories. Consequently, an improved mechanism for managing credentials for accessing data repositories is desired.

BRIEF DESCRIPTION OF THE DRAWINGS

Various embodiments of the invention are disclosed in the following detailed description and the accompanying drawings.

DETAILED DESCRIPTION

Figure 1:
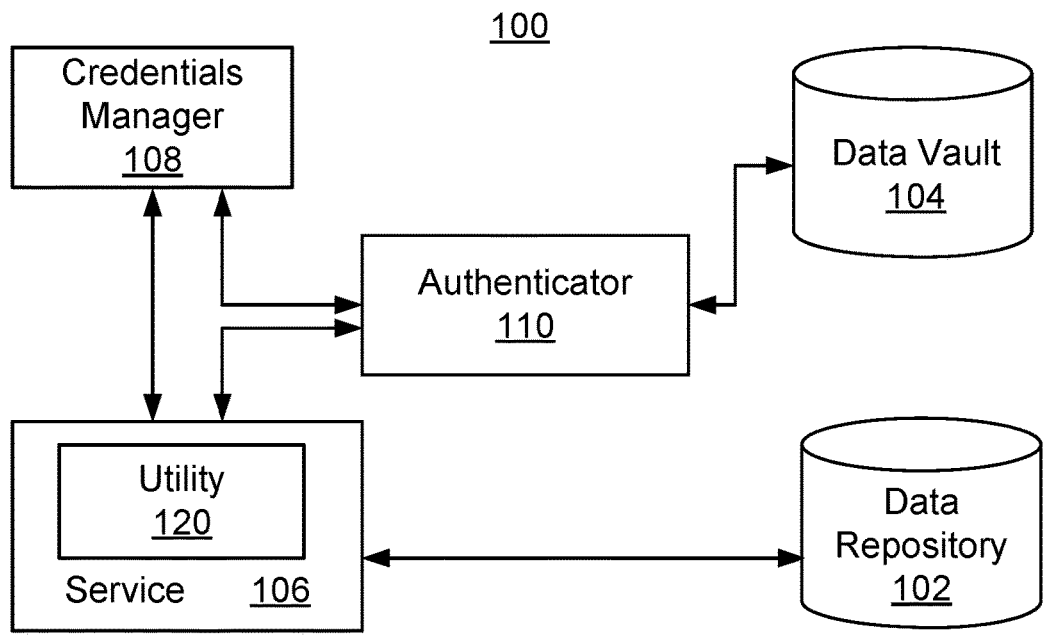
FIG. 1 is a block diagram depicting an embodiment of a credentials management system for a data repository.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many enterprises, irrespective of the markets they are in, are going through a digital transformation. A significant part of this transformation involves providing applications and services that offer new channels for engaging with customers. Another part of the transformation involves creating new data pipelines and analyses that aid in understanding and reacting to the marketplace. As a result, there has been an explosion in the number of computing applications and computing services interacting with data. In many instances, networks for enterprises interact with computing services (e.g. web portals for customers) developed by outside parties. These services frequently do not include a human in the loop. As a result, providing security and observability (knowledge related to the transactions, and metrics indicating characteristics of the services' interactions with the data) for such applications may be challenging.

For example, some computing services utilize data stored in a data repository. At least some of the data in the repository may be sensitive (e.g. social security numbers and/or credit card numbers). Consequently, the service is generally authenticated before being allowed to connect to the data repository. In order to access the data repository, a service may obtain credentials for the data repository from a data vault. A data vault is a secure data storage system that may be dedicated to storing sensitive data, such as credentials for other data repositories in the system. The data vault may also abstract the credentials away from the code and rotate the credentials without impacting performance. Thus, the data vault may improve the security of the credentials. The service obtains credentials for the data repository of interest from the data vault. The service provides these credentials to the data repository in order to be authenticated. Upon authentication, the service is allowed to engage in transactions with the data repository.

Although this authentication method functions, issues persist. As the number of services increase, governing access for different services becomes increasingly challenging. Further, the credentials provided from the data vault are stored in memory of the service. If the security of the service is compromised by an intruder, the intruder can gain access to the credentials stored in memory and, therefore, the data repository. The service could also inadvertently leak the credentials to logs. Thus, services present vulnerabilities for sensitive data repositories. In addition, observability may be problematic. The credentials used by the service may be shared credentials (e.g. the same credentials are used by multiple services). The use of shared credentials makes it challenging to disambiguate data layer service interactions. Some microservices architectures map a data repository per service. However, multiple instances of the same service may be running at any point in time. Consequently, it may not be possible disambiguate different instances of the same service. Using the data layer to assign unique credentials to each service also presents issues because such a technique is operationally cumbersome and still presents the same issues for multiple instances of the same service running simultaneously. Consequently, an improved mechanism for managing credentials for accessing data repositories is desired.

A method of accessing a data repository by a service is described. The method includes requesting an authenticator for credentials using a role-based identity. In some embodiments, the role-based identity is obtained by the service. Requesting the authenticator for credentials may include providing a non-repudiable identity of the service. The non-repudiable identity is based on the role-based identity. The method also includes receiving, from the authenticator, temporary data repository access credentials that are based on the role-based identity. The temporary data repository access credentials are abstracted from the credentials, which may be received from a data vault. The service accesses the data repository using the temporary data repository access credentials. In some embodiments, accessing the data repository is performed not only using the temporary data repository access credentials but also without the credentials being provided to the service.

The method may also include requesting the data repository for access. In some such embodiments, the requesting the authenticator for credentials further includes providing a challenge received from the data repository in response to a request for access and providing to the authenticator a non-repudiable identity of the service. The non-repudiable identity is based on the role-based identity. The temporary data access credentials may include a response to the challenge. Thus, the accessing the data repository includes providing to the data repository the response to the challenge. In some embodiments, transactions between the data repository and the service are logged. The logs may identify the service.

A method for providing access to a data repository for a service is also described. The method includes receiving, at an authenticator, a request for credentials for the data repository. The request includes a role-based identity for the service. Receiving the request may include receiving a non-repudiable identity of the service. In some embodiments, the non-repudiable identity is based on the role-based identity. In some embodiments, receiving the request includes receiving a challenge received by the service from the data repository in response to a request for access to the data repository. The method also includes requesting, by the authenticator, a data vault for the credentials for the data repository based on the role-based identity and receiving, at the authenticator, the credentials. The credentials may be received from the data vault. Temporary data repository access credentials are generated based on the credentials and the role-based identity. The temporary data repository access credentials are provided to the service. The temporary data repository access credentials allow the service to access the data repository. In some embodiments, the temporary data repository access credentials allow the service to access the data repository without the credentials being provided to the service. Determining the temporary data repository access credentials may include determining a response to the challenge.

A system is also described. The system includes a processor and a memory coupled to the processor and configured to provide the processor with instructions. The processor is configured to request an authenticator for credentials to access a data repository using a role-based identity for a service. To request the authenticator for credentials, the processor may also be configured to provide a non-repudiable identity of the service. The non-repudiable identity is based on the role-based identity. The processor is also configured to receive, from the authenticator, temporary data repository access credentials for a data repository based on the role-based identity. The temporary data repository access credentials are abstracted from the credentials. The processor is also configured to access, by the service, the data repository using the temporary data repository access credentials. The processor may also be configured to access the data repository using the temporary data repository access credentials without the credentials being provided to the service. In some embodiments, the processor obtains a role-based identity. In some embodiments, the processor is further configured to request the data repository for access. To request the authenticator for credentials the processor may also be configured to provide a challenge received from the data repository in response to a request for access and a non-repudiable identity of the service. The non-repudiable identity is based on the role-based identity. The temporary data access credentials may include a response to the challenge. To access the data repository the processor is further configured to provide to the data repository the response to the challenge.

A computer program product embodied in a no transitory computer readable storage medium and comprising computer instructions for accessing a data repository by a service is described. The computer program product includes computer instructions for requesting an authenticator for credentials using a role-based identity. In some embodiments, the role-based identity is obtained by the service. Computer instructions for requesting the authenticator for credentials may include computer instructions for providing a non-repudiable identity of the service. The non-repudiable identity is based on the role-based identity. The computer program product also includes computer instructions for receiving, from the authenticator, temporary data repository access credentials that are based on the role-based identity. The temporary data repository access credentials are abstracted from the credentials, which may be received from a data vault. The service accesses the data repository using the temporary data repository access credentials. In some embodiments, accessing the data repository is performed not only using the temporary data repository access credentials but also without the credentials being provided to the service.

A computer program product embodied in a non-transitory computer readable storage medium and comprising computer instructions for providing access to a data repository for a service is also described. The computer program product includes computer instructions for receiving, at an authenticator, a request for credentials for the data repository. The request includes a role-based identity for the service. Receiving the request may include receiving a non-repudiable identity of the service. In some embodiments, the non-repudiable identity is based on the role-based identity. In some embodiments, receiving the request includes receiving a challenge received by the service from the data repository in response to a request for access to the data repository. The computer program product also includes computer instructions for requesting, by the authenticator, a data vault for the credentials for the data repository based on the role-based identity and receiving, at the authenticator, the credentials. The credentials may be received from the data vault. The computer program product may also include computer instructions for generating temporary data repository access credentials based on the credentials and the role-based identity. The temporary data repository access credentials are provided to the service. The temporary data repository access credentials allow the service to access the data repository. In some embodiments, the temporary data repository access credentials allow the service to access the data repository without the credentials being provided to the service. The computer instructions for determining the temporary data repository access credentials may include computer instructions for determining a response to the challenge.

FIG. 1 depicts an embodiment of system 100 for managing access to data repositories. System 100 includes authenticator 110 and utility 120. Also shown are data repository 102, data vault 104, credentials manager 108 and service 106 in which the utility 120 may be used. In some embodiments, credentials manager 108 and/or data vault 104 are accessible via the cloud. Although one data repository 102, one data vault 104, one service 106 and one credentials manager 108 are shown, multiple data repositories, data vaults, services and credentials managers may be used with one or more utility 120 and authenticator 110.

Data repository 102 stores data that is desired to be accessed by service 106. At least some of the data stored by data repository 102 may be sensitive data. Data repository 102 requires services, such as service 106, to be authenticated before allowing access to the data stored therein. Data repository 102 may include databases compatible with, for example, MySQL, PostgreSQL, and/or MariaDB. Data vault 104 is a repository for securely storing data, such as credentials data repository 102 utilizes for authenticating services. Data vault 104 may rotate credentials for data repository 102 or otherwise perform functions to improve the security of the credentials for data repository 102. Service 106 includes a set of functionalities and may be run on one or more processors. Service 106 may be an external user of data source 102 or may be part of the same organization as data source. In some embodiments, credentials manager 108 is an identity access management (IAM) component that allows access to various resources based on roles. For example, credentials manager 108 may be an AWS (Amazon Web Services) IAM tool or analogous service.

Utility 120 is part of service 106 and interacts with authenticator 110. Utility 120 may be a software development kit (SDK). In some embodiments, utility 120 includes a lightweight library with multi language and multi cloud support for enabling a service (e.g. a web app, an ETL job, an ML model builder, etc.) to securely connect to data repository 102 without requiring service 106 to obtain and store the credentials for data repository 102. Utility 120 may be considered to establish a non-repudiable identity for service 106 based on the role (e.g. an IAM role) assigned to service 106 by an administrator and provided by credentials manager 108. Utility 120 utilizes temporary credentials provided by authenticator 110 to access data repository 102.

In some embodiments, utility 120 also collects information regarding the accesses of data repository 102 by service 106. This functionality aids in providing observability for service 106. For example, utility 120 may collect logs related to transactions, provide metrics and provide traces related to the interaction of service 106 with data repository 102. Utility 120 may send the collected logs, metrics and traces to SIEM (security information and event management), APM (application performance management) and/or tracing backends. Thus, observability into service 106 can be imparted from a data layer activity perspective. In some embodiments, service 106 can leverage its unique identity to access the data layer. In the process, all the logs, metrics and traces can be enriched with this unique identity resulting in true observability in the data layer.

Authenticator 110 is used to provide temporary data repository access credentials to service 106 in response to a request provided via utility 120. Temporary data repository access credentials expire or otherwise become unusable after a time interval. In some embodiments, temporary data access credentials expire or become unusable after a particular number of uses (e.g. one use, two uses, etc.) Authenticator 110 communicates with data vault 104 to obtain the appropriate credentials for data repository 102 based on the role of utility 120. Authenticator 110 also determines temporary data repository access credentials that are based on but different (e.g. abstracted) from the credentials stored in data vault 104. Thus, authenticator 110 prevents service 106 from obtaining the credentials stored in data vault 104. The temporary data repository access credentials determined and provided by authenticator 110 are usable by data repository 102 for authenticating service 106. In some embodiments, authenticator 110 is a stateless service. In some embodiments, authenticator 110 supports multiple data repositories 102 such as MySQL, PostgreSQL, and MariaDB, and implements the various challenge-response protocols and algorithms required by such data repositories.

In operation, service 106 attempts to connect to data repository 102. Utility 120 obtains a role-based identity from credentials manager 108. In some embodiments, utility 120 utilizes the role (e.g. the IAM role) of service 106 to request temporary credentials from credentials manager 108 (or other portion of the cloud provider's security infrastructure). On AWS, for example, utility 120 obtains these temporary credentials via the Security Token Service (STS). In some embodiments, utility 120 uses the temporary credentials to sign a request to the GetCallerIdentity API of STS. The request itself is not executed. However, the signed request becomes a non-repudiable identity of service 106. Thus, the signed request may be considered the role-based identity. In some embodiments, the role-based identity used for authenticating service 106 need not be non-repudiable.

Utility 120 provides a request to authenticator 120 to obtain credentials for data repository 102 using the role based (e.g. non-repudiable) identity. Authenticator 110 thus receives a request from utility 120 running as part of service 106 that is attempting to connect to data repository 102.

Authenticator 110 obtains role-based credentials for data repository 102 from data vault 104 based on the role-based identity. In the example above, authenticator 110 executes the signed GetCallerIdentity request to determine the IAM role assigned to service 106. Authenticator 110 queries data vault 104 (such as Hashicorp Vault, AWS Secrets Manager, etc.) to determine the appropriate data repository credentials to use for the IAM role of service 106. Thus, authenticator 110 obtains role-based credentials for service 106.

Based on the role-based credentials, authenticator 110 determines temporary data repository access credentials usable for accessing data repository 102. To determine the temporary credentials, authenticator 110 abstracts the credentials in a manner recognizable by data repository 102. In the example above, authenticator 110 computes the response to data repository's challenge using the credentials read from data vault 104. This allows service 106 attempting to connect to data repository 102 to not require access to the credentials in order to connect to data repository 102. Authenticator 110 provides the temporary credentials to service 106 (e.g. to utility 120). Service 106 utilizes these temporary credentials to access data repository 102.

Thus, authenticator 110 and utility 120 allow service 106 to connect with and utilize data repository 102 without obtaining from credentials form data vault 104 or storing credentials for data repository 102 at service 106. Moreover, data repository 102 can rotate credentials without affecting operation of authenticator 110 and utility 120. Consequently, security for data repository 102 may be greatly enhanced. Further, utility 120 may also collect logs and other information related to the transactions service 106 engages in, particularly with respect to data repository 102. Thus, observability into the activities of service 106 is enhanced. As a result, security for and management of data repository 102 and/or service 106 may be enhanced.

Figure 2:
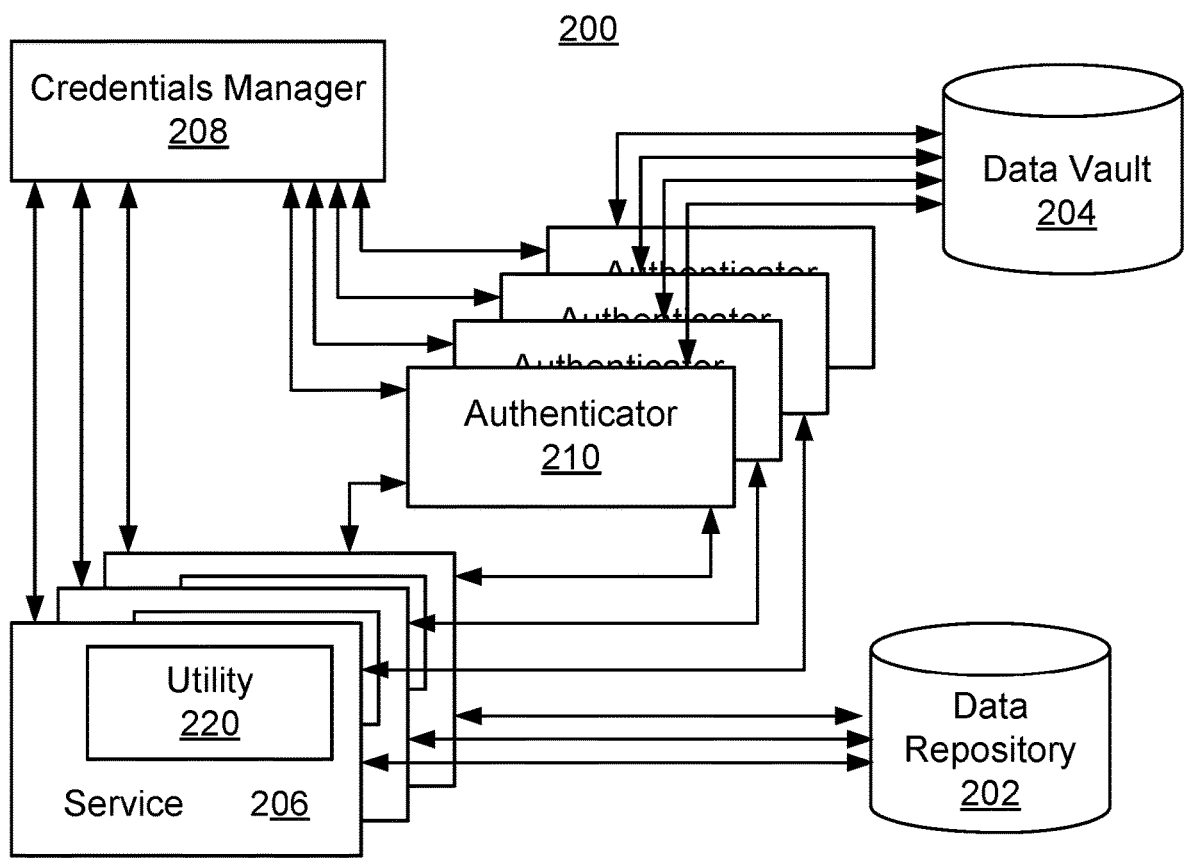
FIG. 2 is a block diagram depicting an embodiment of a credentials management system for a data repository.

FIG. 2 depicts an embodiment of system 200 for managing access to data repositories. System 200 includes multiple authenticators 210 and multiple utilities 220, each of which is analogous to authenticator 110 and utility 120, respectively. Also shown are data repository 202, data vault 204, credentials manager 208 and services 206 that are analogous to data repository 102, data vault 104, credentials manager 108 and service 106, respectively. Although one data repository 202, one data vault 204 and one credentials manager 208 are shown, multiple data repositories, data vaults and credentials managers may be used with one or more utilities 220 and authenticators 210. Thus, system 200 indicates that multiple instances of authenticator 210 and utility 220 may be used. System 200 thus shares the benefits of system 100.

Figure 3:
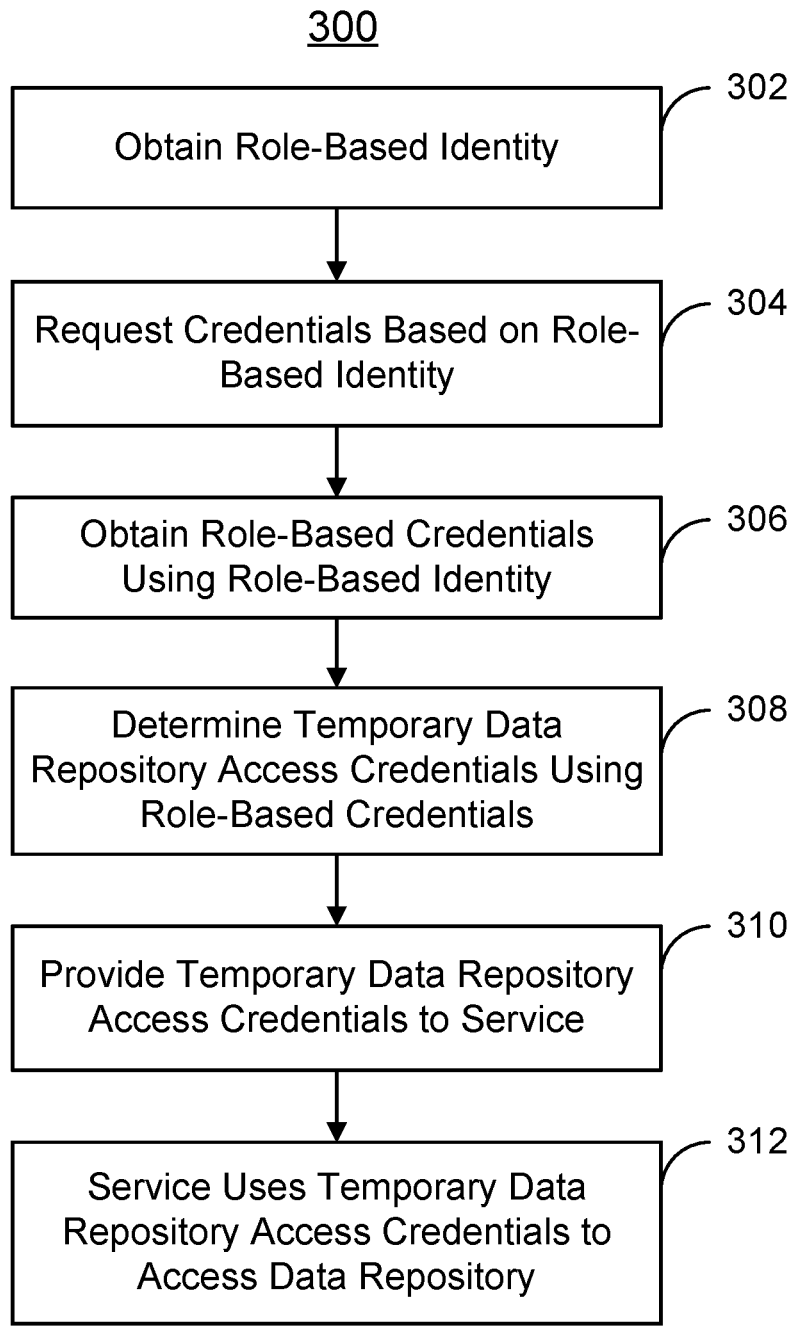
FIG. 3 is a flow chart depicting an embodiment of a method for managing credentials for a data repository.

FIG. 3 is a flow chart depicting an embodiment of method 300 used in managing credentials for accessing databases. In some embodiments, processes in method 300 may be performed in another order (including in parallel) and/or may include substeps.

A role-based identity is obtained, at 302. In some embodiments, the role-based identity is obtained using temporary role-based credentials. In some embodiments, utility 120 utilizes the role (e.g. the IAM role) of service 106 to request temporary credentials from credentials manager 106.

Credentials for a data repository are requested based on the role-based identity, at 304. Role-based credentials are obtained based on the role-based identity, at 306. For example, utility 120 may provide a request to authenticator 110 at 304. Authenticator 110 obtains role-based credentials for data repository 102 from data vault 104 based on the role-based identity at 306.

Temporary data repository access credentials for the service are determined based on the role-based credentials, at 308. These temporary data repository access credentials are provided to the service at 310. For example, credentials authenticator 110 determines temporary data repository access credentials usable for accessing data repository 102 at 308. In some embodiments, authenticator 110 determines the response to a challenge by data repository 102 at 308. Authenticator 110 provides the temporary data repository access credentials to service 106 (e.g. to utility 120), at 310. These temporary data repository access credentials are used to access the data repository, at 312. For example, service 106 utilizes these temporary data repository access credentials to access data repository 102 at 312.

Using method 300 a service is allowed to connect with and utilize a data repository without accessing or storing credentials for data repository. Consequently, security for data repository 102 may be greatly enhanced. Further, the utility may also collect logs and other information related to the transactions service engages in. Thus, observability into the activities of service is enhanced. As a result, security for and management of data repositories and/or services may be enhanced.

Figure 4:
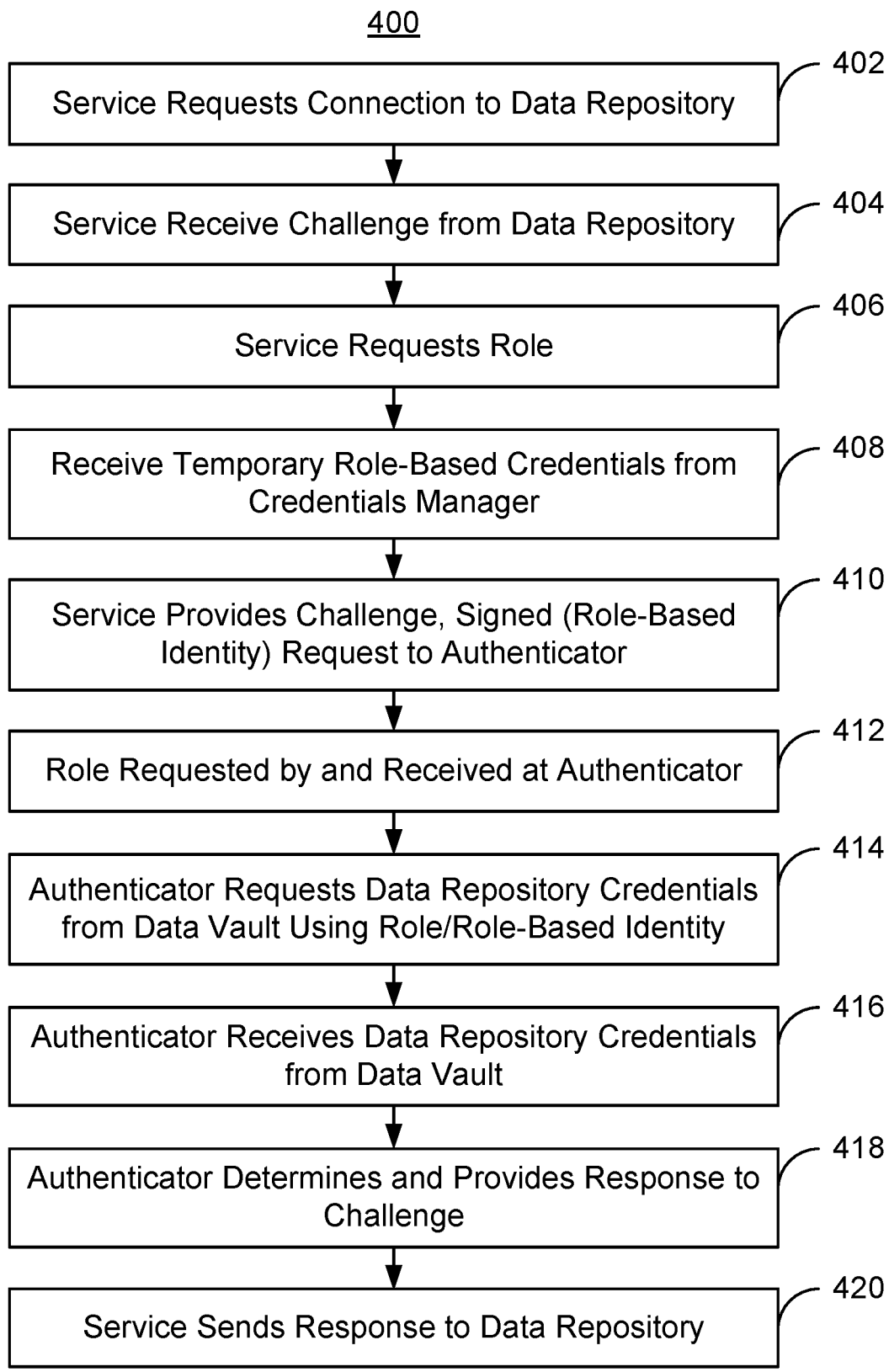
FIG. 4 is a flow chart depicting an embodiment of a method for managing credentials for a data repository.
Figure 5:
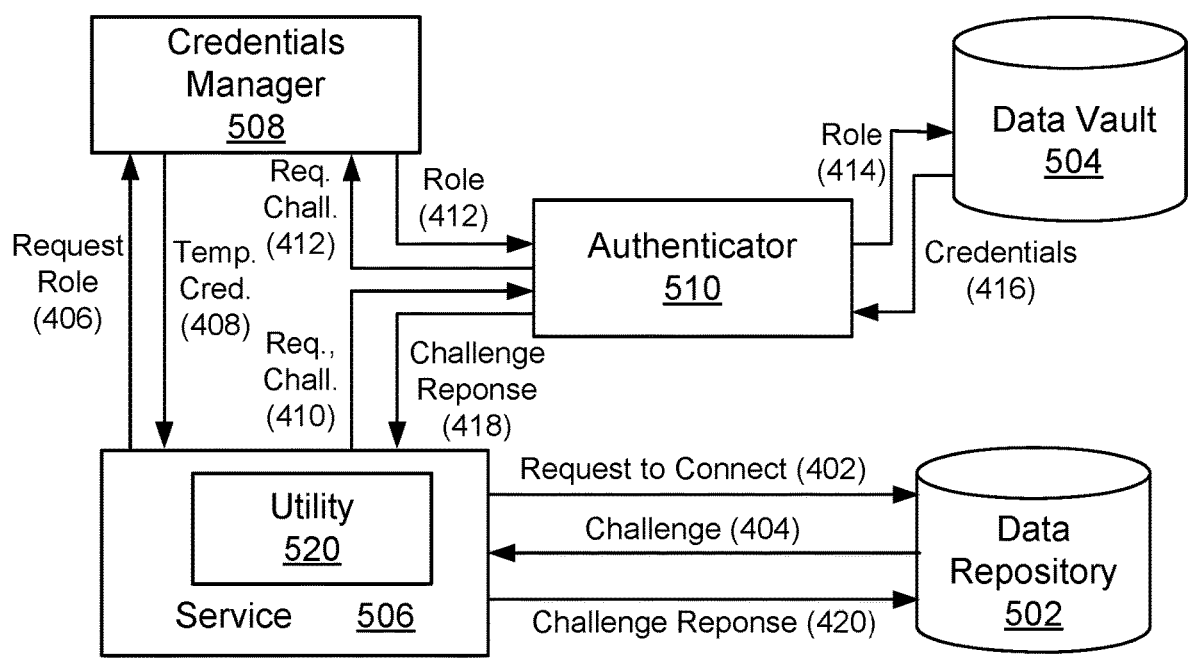
FIG. 5 is a diagram depicting an embodiment of the communications utilized to access a data repository.

FIG. 4 is a flow chart depicting an embodiment of method 400 used in managing credentials for accessing databases. In some embodiments, processes in method 400 may be performed in another order (including in parallel) and/or may include substeps. FIG. 5 is a diagram depicting an embodiment of system 500 in which the communications utilized to access a data repository are indicated. Method 400 is described in the context of system 500. System 500 is analogous to system 100. Thus, system 500 includes data repository 502, data vault 504, service 506, authenticator 510 and utility 520 that are analogous to data repository 102, data vault 104, service 106, authenticator 110 and utility 120, respectively.

Service 506 sends a connect request to data repository 502, at 402. Data repository 502 responds with a challenge, at 404. Data repository 502 requires the appropriate response to the challenge to authenticate service 506. Role-based credentials are used in order to determine the response. However, service 506 does not store role-based credentials.

Service 506 thus connects to credentials manager 508 (e.g. Amazon STS's AssumeRole) using its stored Access Key ID, SecretKey, and the ARN (Amazon Resource Name) of the service's requested role, at 406. Thus, service 506 requests its service role from credential s manager 508. Service 506 receives temporary role-based credentials from credentials manager 508, at 408. These credentials are used by service 506 to sign a GetCallerIdentity request, which then becomes the non-repudiable identity of the service. Service 506 requests credentials for data repository 502 from authenticator 510 using its non-repudiable identity. To do so, service 506 sends the challenge and signed GetCallerIdentity request to authenticator 510, at 410. Using the non-repudiable identity, authenticator 510 requests the role for service 506 from credentials manager 508. To do so, authenticator executes the signed GetCallerIdentity request, which ensures credentials manager 508 returns the ARN of the IAM role assigned to the services. Although its ARN is already known by service 506, by calling GetCallerIdentity with a signed request, service 506 proves to authenticator 510 that service 506 has the IAM role it claims to have. Thus, the GetCallerIdentity may be desirable to use. Thus, at 412, authenticator 510 requests the role for service 506 from credentials manager 508 and receives the role from credentials manager 508 in response. In other embodiments, another mechanism for obtaining the role may be used.

Authenticator 510 queries data (e.g. secrets) vault 504 for the data repository credentials appropriate for the role, at 414. Authenticator 510 receives the data repository credentials from data vault 504, at 416. Authenticator 510 determines temporary data repository credentials for service 504 and provides the temporary date repository credentials to service 506. For example, authenticator 510 receives the credentials from data vault 504 and uses those credentials to compute the response for the database challenge provided by data repository 504. Authenticator 510 returns to service 502 the database challenge response for the database challenge. The service sends the database challenge response to the data repository, a 420. Service 506 may thus access a data repository 504 and the data contained therein. During service's access of data repository 502, utility 520 may monitor activities of service 506.

Thus, using the technique and system depicted in FIGS. 4 and 5, a service 506 is allowed to connect with and utilize a data repository 502 without accessing credentials for data repository. Consequently, security for data repository 102 may be greatly enhanced. Further, the utility may also collect logs and other information related to the transactions service engages in. Thus, observability into the activities of service is enhanced. As a result, security for and management of data repositories and/or services may be enhanced. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of accessing a data repository by a service, comprising:
    requesting an authenticator for credentials using a role-based identity;
    receiving, from the authenticator, temporary data repository access credentials based on the role-based identity, the temporary data repository access credentials being abstracted from the credentials, wherein the temporary data repository access credentials expire or become unusable after a time interval, and wherein the receiving of the temporary data repository access credentials comprises:
        receiving, at the authenticator, a challenge from a service;
        computing, by the authenticator, a response to the challenge based on the temporary data repository access credentials; and
        returning, by the authenticator, the response to the service;
    accessing, by the service, the data repository using the temporary data repository access credentials.

2. The method of claim 1, wherein the accessing further includes:
    accessing the data repository using the temporary data repository access credentials without the credentials being provided to the service.

3. The method of claim 1, further comprising:
    obtaining a role-based identity.

4. The method of claim 3, wherein the requesting the authenticator for credentials further includes:
    providing a non-repudiable identity of the service, the non-repudiable identity being based on the role-based identity.

5. The method of claim 4, further comprising:
    requesting the data repository for access; and wherein the requesting the authenticator for credentials further includes
    providing a challenge received from the data repository in response to a request for access and a non-repudiable identity of the service, the non-repudiable identity being based on the role-based identity.

6. The method of claim 1, further comprising
    logging a plurality of transactions between the data repository and the service, the logging including identifying the service.

7. The method of claim 1, wherein the credentials are stored in a data vault.

8. A method for providing access to a data repository for a service, comprising:
    receiving, at an authenticator, a request for credentials for the data repository, the request including a role-based identity for the service, comprising:
        receiving a challenge received by the service from the data repository in response to a request for access to the data repository;
    requesting, by the authenticator, a data vault for the credentials for the data repository based on the role-based identity;
    receiving, at the authenticator, the credentials from the data vault;
    determining temporary data repository access credentials based on the credentials and the role-based identity, wherein the temporary data repository access credentials expire or become unusable after a time interval, and wherein the determining of the temporary data repository access credentials comprises:
        computing, by the authenticator, a response to the challenge based on the temporary data repository access credentials; and
        returning, by the authenticator, the response to the service;
    providing to the service the temporary data repository access credentials, the temporary data repository access credentials allowing the service to access the data repository.

9. The method of claim 8, wherein the temporary data repository access credentials allow the service to access the data repository without the credentials being provided to the service.

10. The method of claim 8, wherein the receiving the request for credentials further includes:
    receiving a non-repudiable identity of the service, the non-repudiable identity being based on the role-based identity.

11. The method of claim 8, wherein the credentials are stored in a data vault.

12. A system, comprising:
    a processor configured to:
        request an authenticator for credentials to access a data repository using a role-based identity for a service;
        receive, from the authenticator, temporary data repository access credentials for a data repository based on the role-based identity, the temporary data repository access credentials being abstracted from the credentials, wherein the temporary data repository access credentials expire or become unusable after a time interval, and wherein the receiving of the temporary data repository access credentials comprises to:
            receive, at the authenticator, a challenge from the service;
            compute, by the authenticator, a response to the challenge based on the temporary data repository access credentials; and
            return, by the authenticator, the response to the service; and
        access, by the service, the data repository using the temporary data repository access credentials; and
    a memory coupled to the processor and configured to provide the processor with instructions.

13. The system of claim 12, wherein to access the data repository, the processor is further configured to:

access the data repository using the temporary data repository access credentials without the credentials being provided to the service.

14. The system of claim 12, wherein the processor is further configured to:
obtain a role-based identity.

15. The system of claim 14, wherein to request the authenticator for credentials, the processor is further configured to:
provide a non-repudiable identity of the service, the non-repudiable identity being based on the role-based identity.

16. The system of claim 15, wherein the processor is further configured to:
request the data repository for access; and wherein to request the authenticator for credentials the processor is further configured to:
provide a challenge received from the data repository in response to a request for access and a non-repudiable identity of the service, the non-repudiable identity being based on the role-based identity.

* * * * *